US008752989B2

(12) United States Patent
Roberts et al.

(10) Patent No.: US 8,752,989 B2
(45) Date of Patent: Jun. 17, 2014

(54) ILLUMINATED CHROMATIC VEHICLE EMBLEM

(75) Inventors: Richard J. Roberts, Clinton Township, MI (US); LaRon Michelle Brown, Birmingham, MI (US); Cornel Lewis Gardner, Romulus, MI (US)

(73) Assignees: Ford Global Technologies, LLC, Dearborn, MI (US); Colonial Plastics, Inc., Clinton Township, MI (US)

( * ) Notice: Subject to any disclaimer, the term of this patent is extended or adjusted under 35 U.S.C. 154(b) by 0 days.

(21) Appl. No.: 13/526,857

(22) Filed: Jun. 19, 2012

(65) Prior Publication Data

US 2013/0335997 A1 Dec. 19, 2013

(51) Int. Cl.
*B60Q 1/26* (2006.01)
*F21V 9/16* (2006.01)

(52) U.S. Cl.
USPC .............................. 362/496; 362/509; 362/84

(58) Field of Classification Search
USPC .................................... 362/496, 509, 84, 511
See application file for complete search history.

(56) References Cited

U.S. PATENT DOCUMENTS 3,341,915 A 9/1967 Knochel et al.
4,208,869 A 6/1980 Hanaoka
4,788,550 A * 11/1988 Chadima, Jr. ................. 343/712
4,977,695 A * 12/1990 Armbruster ..................... 40/541
5,471,554 A 11/1995 Rukavina et al.
5,641,221 A 6/1997 Schindele et al.
5,841,738 A 11/1998 Kamei et al.
6,045,643 A 4/2000 Byker et al.
6,136,161 A 10/2000 Yu et al.
6,158,868 A 12/2000 Chien
6,930,815 B2 8/2005 Berneth et al.
7,582,000 B2 * 9/2009 Pendlebury et al. ............ 445/24
7,748,148 B2 * 7/2010 Reiland et al. .................. 40/564
7,752,791 B2 * 7/2010 Misawa et al. .................. 40/546
7,848,021 B2 * 12/2010 Asakura et al. ............... 359/599
7,952,785 B2 5/2011 Karmhag et al.
8,016,467 B2 * 9/2011 Eberwein ...................... 362/497
8,113,695 B2 * 2/2012 Meinke et al. ................ 362/351
8,266,833 B2 9/2012 Pierce et al.
8,303,147 B2 * 11/2012 Jeon .............................. 362/501
8,449,161 B2 * 5/2013 Igoe et al. ..................... 362/558
2004/0104816 A1 6/2004 Wilson
2004/0232434 A1 11/2004 Chen
2008/0128286 A1 6/2008 Wu et al.

(Continued)

FOREIGN PATENT DOCUMENTS

JP 61213829 9/1986
JP 5061074 3/1993

*Primary Examiner* — Peggy A. Neils
(74) *Attorney, Agent, or Firm* — Vichit Chea; Price Heneveld LLP

(57) ABSTRACT

An illuminated vehicle emblem assembly is provided that includes a power source, a backing member, and a light-producing assembly coupled to the power source and supported by the backing member. The light-producing assembly may include an electroluminescent light source. The illuminated vehicle emblem assembly further includes a translucent base region over the light source, a chromatic layer over the translucent base region, and a translucent sealing structure configured to seal the backing member, the light producing assembly, and the chromatic layer. The illuminated vehicle emblem assembly exhibits a chrome- or mirror-like finish when viewed under ambient lighting conditions. Further, the illuminated vehicle emblem assembly possesses a glowing appearance when activated under low-light or night-time conditions.

17 Claims, 6 Drawing Sheets

(56) References Cited

U.S. PATENT DOCUMENTS

2010/0102538 A1* 4/2010 Paxton et al. .............. 280/728.3
2011/0003070 A1 1/2011 Pozo Gonzalo et al.
2011/0128311 A1 6/2011 Wakatsuki et al.
2012/0144705 A1 6/2012 Pierce et al.

* cited by examiner

ILLUMINATED CHROMATIC VEHICLE EMBLEM

FIELD OF THE INVENTION

The present invention generally relates to an emblem, and more particularly relates to an illuminated, chromatic emblem for use on a vehicle.

BACKGROUND OF THE INVENTION

Emblems and badges are commonly employed on vehicles to convey various aesthetic and stylistic features. They may also be used to display a vehicle manufacturer's logos, names, trademarks or other graphics. Enhancements to the attractiveness of these badges or emblems may also be desirable.

The engineering and design of emblems and badges for use in a vehicle requires a consideration of various environmental factors. These units should be sufficiently durable to maintain their attractiveness over the lifetime of the vehicle. In some cases, the emblems and badges may be used in an under-the-hood configuration and require additional temperature resistance.

SUMMARY OF THE INVENTION

One aspect of the present invention is to provide an illuminated vehicle emblem assembly that includes a power source, a backing member, and a light-producing assembly coupled to the power source and supported by the backing member. The light-producing assembly includes an electroluminescent light source. The illuminated vehicle emblem assembly further includes a translucent base region over the light source, a chromatic layer over the translucent base region, and a translucent sealing structure configured to seal the backing member, the light producing assembly, and the chromatic layer.

Another aspect of the present invention is to provide an illuminated vehicle emblem assembly that includes a power source, a backing member, and a light-producing assembly coupled to the power source and supported by the backing member. The light-producing assembly includes an LED light source. The illuminated vehicle emblem assembly further includes a translucent base region over the light source, a chromatic layer over the translucent base region, and a translucent sealing structure configured to seal the backing member, the light producing assembly, and the chromatic layer.

A further aspect of the present invention is to provide an illuminated vehicle emblem assembly that includes a power source, a backing member, and a light-producing assembly coupled to the power source and supported by the backing member. The light-producing assembly includes a fiber optic light source. The illuminated vehicle emblem assembly further includes a translucent base region over the light source, a chromatic layer over the translucent base region, and a translucent sealing structure configured to seal the backing member, the light producing assembly, and the chromatic layer.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
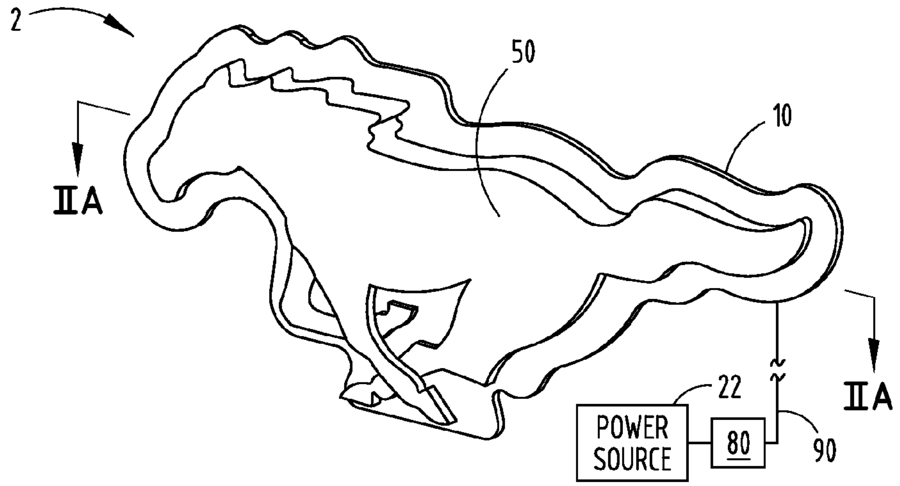
FIG. 2 is an enlarged, top-down perspective view of an illuminated vehicle emblem assembly.
Figure 2A:
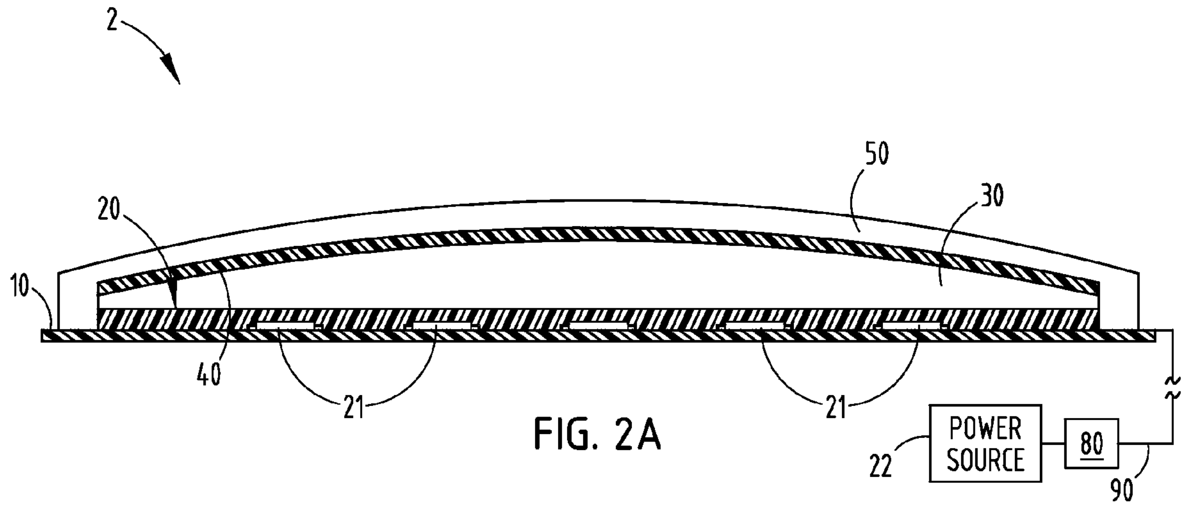
FIG. 2A is a cross-section of the illuminated vehicle emblem assembly shown in FIG. 2.

For purposes of description herein, the terms "upper," "lower," "right," "left," "rear," "front," "vertical," "horizontal," and derivatives thereof shall relate to the invention as oriented in FIG. 2A. However, the invention may assume various alternative orientations, except where expressly specified to the contrary. In addition, the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
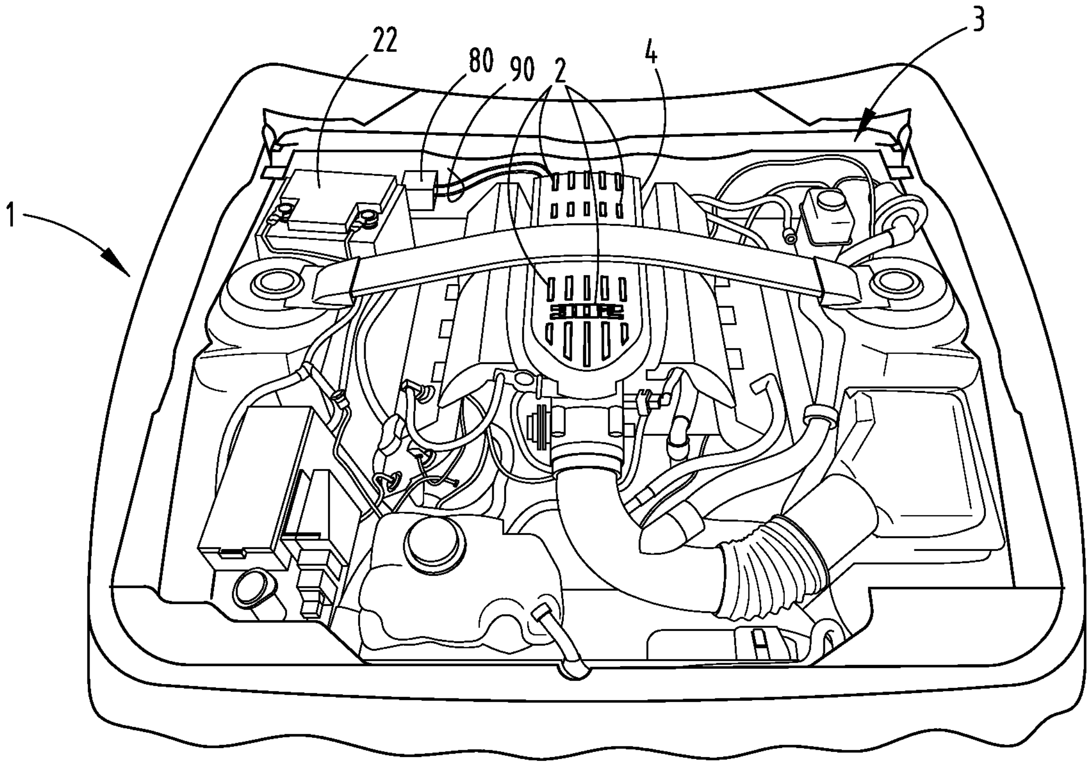
FIG. 1 is a perspective view of the engine compartment of a vehicle (hood removed for clarity) with illuminated emblem assemblies mounted to an engine at various locations.

Referring now to FIG. 1, the engine compartment 3 of vehicle 1 is generally illustrated with its hood removed for clarity. Various illuminated vehicle emblem assemblies 2 are shown mounted to the engine 4 within the engine compartment 3. Vehicle 1 may be an automobile, truck, bus, van or other type of vehicle capable of displaying illuminated vehicle emblem assemblies 2. As shown, the illuminated emblem assemblies 2 are configured in various shapes and designs. Further, emblem assemblies 2 are mounted to engine 4. It should be appreciated that emblem assemblies 2 may be configured in any of a myriad of shapes and designs for use within engine compartment 3, or in other interior locations within vehicle 1. Under ambient lighting conditions, emblem assemblies 2 exhibit a chrome-like or mirrored appearance under the hood of vehicle 1 within engine compartment 3. Under low-light or night-time conditions, emblem assemblies 2 are illuminated and their exterior surfaces appear with a uniform glow.

Vehicle emblem assemblies 2 are coupled to a power supply 22 via wiring 90 and controller 80, as also shown in FIG. 1. Controller 80 is arranged to control assemblies 2 in this configuration. Power supply 22 may be a standard vehicle battery, or a separate battery or another power source within the vehicle. When vehicle emblem assembly 2 is switched to an illuminated state by controller 80, power supply 22 provides the power necessary for the illumination. Vehicle emblem assembly 2 may be switched to an illuminated state by the engagement of a manual switch (not shown), a controller 80 (as shown in FIG. 1) operating according to a predetermined switching algorithm, or another suitable switching configuration.

Figure 1A:
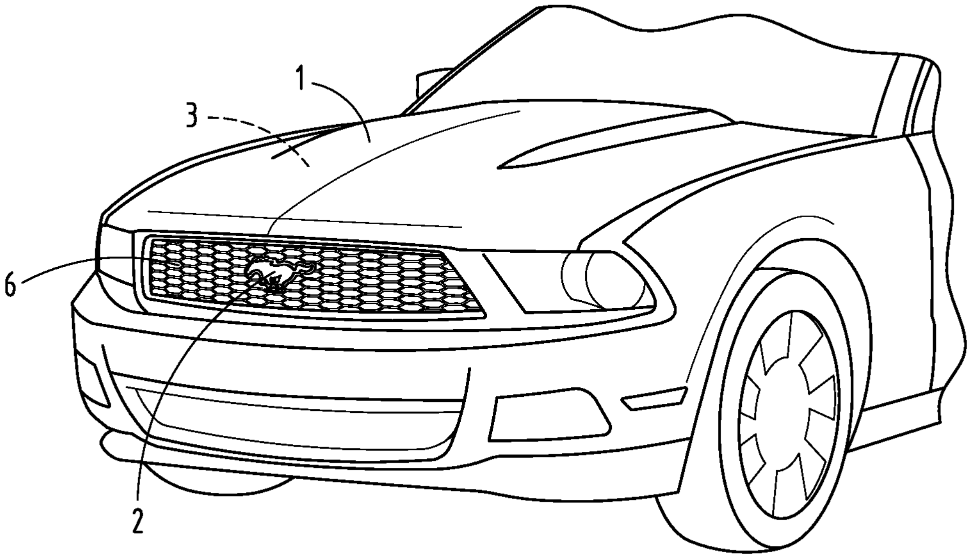
FIG. 1A is a perspective view of a vehicle with an illuminated emblem assembly mounted to the grill of the vehicle.

FIG. 1A generally depicts the front view of vehicle 1 and an illuminated emblem assembly 2. Here, emblem assembly 2 is mounted to an exterior surface of vehicle 1, namely, grille 6. It should be appreciated that emblem assemblies 2 may be configured in any of a myriad of shapes, sizes and designs for use on the exterior of vehicle 1. These illuminated emblem assemblies 2 also exhibit a chrome-like or mirrored appearance when viewed under ambient lighting conditions (e.g., sunlight). Illuminated emblem assemblies 2 mounted to the exterior surfaces of vehicle 1 appear with a uniform glow under low-light or night-time conditions. Further, these assemblies 2 may be powered and controlled in the same fashion as the illuminated emblem assemblies 2 mounted in the engine compartment 3 of vehicle 1 (see FIG. 1), or other interior locations within vehicle 1.

In FIG. 2, an illuminated vehicle emblem assembly 2 is depicted in an oval or ellipsoid-like configuration. As shown in this schematic, vehicle emblem assembly 2 includes an encapsulation structure 50 and a backing member 10. Backing member 10 is configured to attach the illuminated emblem assembly 2 to a vehicle (not shown). Backing member 10 may be arranged as a plate, base or other suitable supporting member to mount illuminated vehicle emblem assembly 2 to the vehicle. Further, backing member 10 may be configured to match the shape, features and contours of the underlying surface of the vehicle 1 at the location specified for mounting the illuminated vehicle emblem assembly 2.

Durable metals, polymers, alloys, composites and other suitable structural materials may be employed for use as backing member 10, provided that they offer high durability under long-term (greater than 10 years) ambient exposure and can be sealed with a water resistant barrier to prevent moisture ingress within the emblem. For example, the backing member 10 may comprise acrylonitrile butadiene styrene (ABS), a combination of polycarbonate and ABS, or other polymeric materials with similar properties. The backing member 10 may be opaque or mirrored to ensure that the majority of the light generated by the illuminated vehicle emblem assembly 2 is focused outward, away from the vehicle. Typically, backing member 10 is injection-molded or die cut, with a first thickness of approximately 1 to 3 mm. Other thicknesses are possible depending on the desired aesthetics for the emblem assembly and/or mounting needs. Preferably, backing member 10 is injection-molded and possesses a thickness of approximately 2.5 to 3 mm.

Encapsulation structure 50 should be substantially translucent. Structure 50 should also provide a water-resistant seal between the backing member 10 and the interior components of illuminated vehicle emblem assembly 2. The encapsulation structure 50 comprises translucent polymeric materials and/or resins resistant to discoloration, crazing, cracking and other deterioration associated with exposure to ambient air, sunlight and moisture. For example, the encapsulation structure 50 may comprise acrylic, nylon, polycarbonate and/or blends of these materials.

When illuminated vehicle emblem assemblies 2 are employed in applications on the exterior of vehicle 1, a variety of polymeric materials may be suitable for use as encapsulation structure 50. These materials must be durable and not yellow, discolor, craze, crack or otherwise deteriorate under ambient, environmental conditions. Preferably, encapsulation structure 50 is comprised of an acrylic material, nylon material, polycarbonate material or blend of these materials when the illuminated vehicle emblem assembly 2 is mounted to the exterior of (e.g., the grill) or interior of vehicle 1. For example, encapsulation structure 50 can comprise a blend of nylon and polycarbonate constituents. In particular, these constituents may be blended at a ratio of 40 to 60% nylon to 40 to 60% polycarbonate by weight.

In situations where illuminated vehicle emblem assembly 2 is mounted in the engine compartment 3 of vehicle 1, the encapsulation structure 50 must be durable under the increased temperatures associated with the operation of the engine 4. The materials used for encapsulation structure 50 therefore must be heat resistant and not subject to discoloration or other deterioration under these conditions. Accordingly, encapsulation structure 50 may be comprised of acrylic materials or other plastic materials with high percentages of acrylic.

In addition, glass particles may be mixed into encapsulation structure 50 for added durability and temperature resistance. The glass particles may also provide additional light-scattering effects to further enhance the attractiveness of the emblem assembly 2. Still further, the encapsulation structure 50 may be coated with a curable, liquid-based coating that results in a translucent layer for added durability.

Encapsulation structure 50 may be fabricated according to various methods as known in the polymer processing art. For example, encapsulation structure 50 may be made using injection molding tools, equipment and processing conditions. Further, encapsulation structure 50 is attached to the backing member 10 using various mechanical, chemical and thermal techniques that provide a water-tight and durable seal between the member 10 and structure 50. These attachment techniques include sonic welding, vibration welding, hot plate welding, rotational welding, and silicone joining.

FIG. 2A provides a cross-sectional view of the illuminated vehicle emblem 2 depicted in FIG. 2. Backing member 10 is coupled, bonded or otherwise attached to encapsulation structure 50, as discussed earlier. A light source assembly 20 is configured above backing member 10. As depicted in FIG. 2A, light source assembly 20 is mounted directly to backing member 10. It should be appreciated that light source assembly 20 may be coupled to or otherwise reside above backing member 10.

As shown in FIG. 2A, light source assembly 20 is also coupled to power supply 22 via wiring 90 and controller 80. Controller 80 operates to control the illuminated state(s) of vehicle emblem assembly 2 as described in the embodiment depicted in FIG. 1. Light-producing assembly 20 relies on power from power supply 22 to provide the illumination function of vehicle emblem assembly 2. The light-producing assembly 20 may be fabricated with a thickness from approximately 0.1 mm to 3.1 mm. When activated, light-producing assembly 20 generates light rays within illuminated vehicle emblem assembly 2. These light rays travel through the various structures within the emblem assembly 2 and exit through encapsulation structure 50. The light output from the light-producing assembly is then viewed as a glowing, emanation of light through a significant portion of the exterior surface area of vehicle emblem assembly 2. In addition, some light from the emblem assembly 2 may emanate around or near the edges of the backing member 10.

Various types of light sources 21 may be employed within light source assembly 20 to provide the illumination function. These light sources 21 may include incandescent, LED, LED-sourced fiber optic, LED-sourced light pipe, and electroluminescent light-producing elements. Further, these light sources 21 may be configured within light-producing assembly 20 to provide white light or light in various colors. In addition, color light filters and/or lenses may be fitted within light source assembly 20 over light sources 21 to generate configurations of various, desired colors, and shapes through the vehicle emblem assembly 2.

A translucent base region 30 is arranged over the light sources 21 and light-producing assembly 20. Preferably, base region 30 is void space. However, base region 30 may also comprise any of a variety of translucent, polymeric materials that can be processed in situ to encapsulate and/or cover light sources 21 at temperatures and under conditions that will not damage them. When base region 30 consists of such material, it provides additional sealing for the light-producing assembly 20 beneath it. Base region 30 may also be fabricated as a separate part using injection molding tools, equipment and processing conditions, and then sealed over light-producing assembly 20 and light sources 21 using known methods.

FIG. 2A also illustrates a chromatic layer 40, arranged over the base region 30. The chromatic layer 40 may be observed through the translucent encapsulation structure 50. Chromatic layer 40 gives illuminated vehicle emblem assembly 2 a chrome- or mirror-like appearance. This appearance is evident when light-producing assembly 20 is not activated, and/or under ambient lighting conditions.

The chromatic layer 40 may be comprised of various metal particles, materials, coatings and/or paint that can produce the desired chrome- or mirror-like appearance. Chromatic layer 40 may take the form of a layer, multi-layer, film, coating or other suitable structure. It is to be understood, however, that chromatic layer 40 should be configured with a tailored density of chromatic materials to ensure that light from light-producing assembly 20 can penetrate it when the emblem assembly 2 is activated in an illuminated state. Materials that may be used in chromatic layer 40 include, but are not limited to, automotive-grade metallic paint, automotive-grade silver paint, and particles or flakes containing indium, silver, chromium and/or aluminum. Preferably, chromatic layer 40 is comprised of indium-containing and aluminum-containing particles.

Chromatic layer 40 may be deposited, formed and/or applied according to various methods known in the paint, coating and metallic layer deposition art. One approach for forming chromatic layer 40 is to employ a coating preparation of the desired chromatic particles in a water, alcohol or other organic solvent-based suspension or solution. The chromatic layer preparation is then used to apply multiple coatings of the chromatic particles or paint to the base region 30 (if a solid material) and/or to the underside of encapsulation structure 50. The solvent, water or alcohol base is then evaporated by curing or an ambient evaporation process, leaving a chromatic layer 40 adhered to base region 30 and/or encapsulation structure 50. Another approach is to stress relieve the base region 30 and/or encapsulation structure 50 with a relatively low temperature heating or low-level vibration process. A voltage is then applied to the base region 30 and/or encapsulation structure 50. The final step is to prepare a loading of the chromatic particles (e.g., indium containing particles) and deposit the particles onto the electrified surface of base region 30 and/or encapsulation structure 50.

A further approach to forming chromatic layer 40 is to vacuum metalize the layer on encapsulation structure 50 and/or base region 30. In this case, chromatic layer 40 is comprised of chromium-, aluminum- or other metal-containing particles. A chromatic layer 40 formed by vacuum metallization may also be sealed with a curable, polymeric translucent coating. In addition, chromatic layer 40 may be formed in situ with encapsulation structure 50. For example, chromatic layer 40 could comprise a metalized polymeric film (e.g., a polyethylene terephthalate film) that is draped over an injection mold or cut to the dimensions of such a mold during fabrication of encapsulation structure 50.

Also depicted in FIG. 2A is the encapsulation structure 50. As described earlier, encapsulation structure 50 is translucent and provides a water-resistant seal between the backing member 10 and the interior components of illuminated vehicle emblem 2. Encapsulation structure 50 also seals the light-producing assembly 20, and chromatic layer 40 from the ambient environment. The sealing function of encapsulation structure 50 is particularly important to ensure that excess moisture does not penetrate and cause a short circuit to the light-producing assembly 20 and light sources 21.

FIGS. 3-6 depict first, second, third and fourth embodiments of the illuminated vehicle emblem assembly 2. In general, each of these embodiments can be configured according to the schematic and description of the emblem assembly 2 shown in FIGS. 2 and 2A. However, each of these embodiments relies on different light sources 21 within light-producing assembly 20. It is to be understood that various light sources 21 other than those described here may be employed in light-producing assembly 20 to the same or similar effect.

Referring to FIGS. 3, 3A, 3B and 3C, a first embodiment of illuminated vehicle emblem assembly 2 is depicted with a light-producing assembly 20 containing an electroluminescent light source assembly 60 substituted for the light source 21. The illuminated vehicle emblem assembly 2 is otherwise configured as described in connection with the emblem assembly 2 depicted in FIGS. 2 and 2A. Optionally, design features 100 may be embedded within encapsulation structure 50 as shown. These features may be fabricated of various materials as known in the art. Further, the features 100 may be translucent, tinted or opaque.

Figure 3:
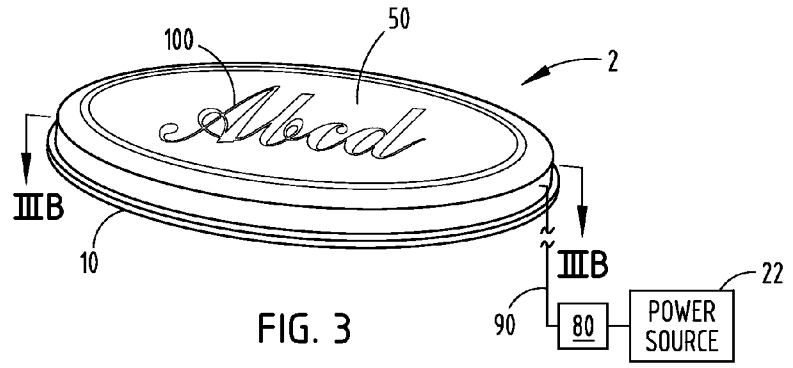
FIG. 3 is a top-down perspective view of an illuminated vehicle emblem assembly, according to a first embodiment.
Figure 3A:
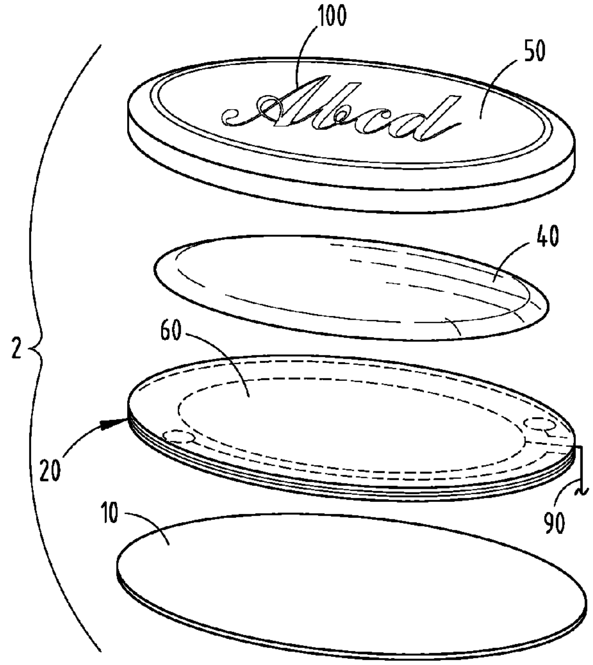
FIG. 3A is an exploded, perspective view of the illuminated vehicle emblem assembly shown in FIG. 3.
Figure 3C:
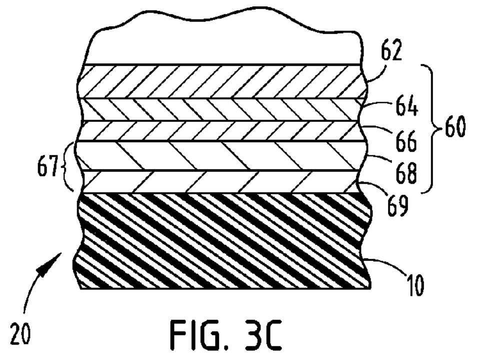
FIG. 3C is a cross-sectional view of the light source assembly contained in the illuminated vehicle emblem assembly shown in FIG. 3.
Figure 3B:
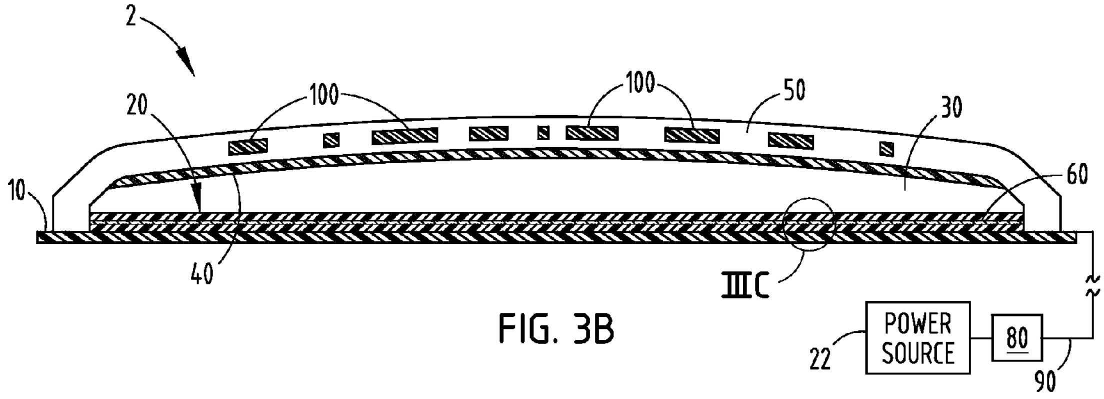
FIG. 3B is a cross-sectional view of the illuminated vehicle emblem assembly shown in FIG. 3.

Electroluminescent light source assembly 60 is to be configured according to a multi-layer structure that produces light through with electroluminescence. Preferably, electroluminescent assembly 60 is arranged as shown in FIG. 3C. A carbon layer 62 is arranged on phosphor layer 64. Carbon layer 62 is coupled to a power supply 22 (see FIG. 3A) and serves as a first electrode in the electroluminescent assembly 20 configuration. The phosphor layer 64 may comprise aluminum and silver nitrate materials. A die eyelet structure 66 is arranged under the phosphor layer 64. Finally, a transparent electrode 67 is coupled to power supply 22 and configured under die eyelet structure 66. Transparent electrode 67 may be comprised (as shown in FIG. 3C) of two layers: an indium-tin-oxide layer 68 and an antimony-tin-zirconium oxide layer 69. Transparent electrode 67 may also be configured with other suitable transparent electrode materials and configurations.

Figure 4:
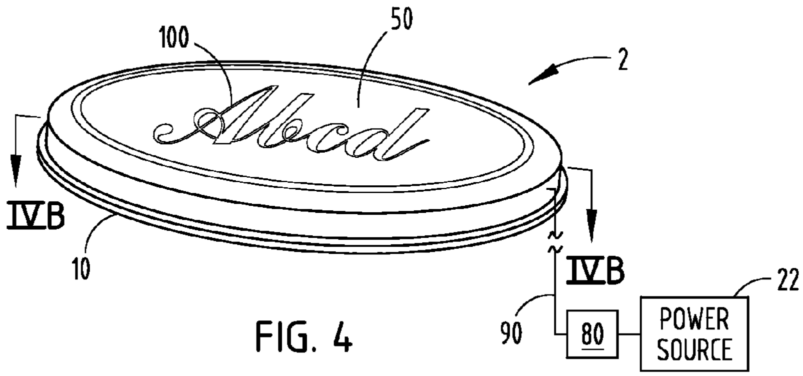
FIG. 4 is a top-down perspective view of an illuminated vehicle emblem assembly, according to a second embodiment.
Figure 4A:
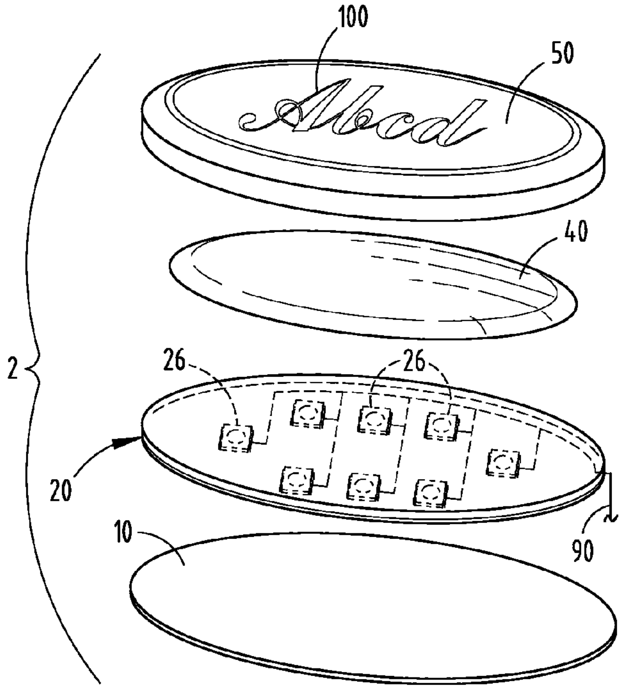
FIG. 4A is an exploded, perspective view of the illuminated vehicle emblem assembly shown in FIG. 4.
Figure 4B:
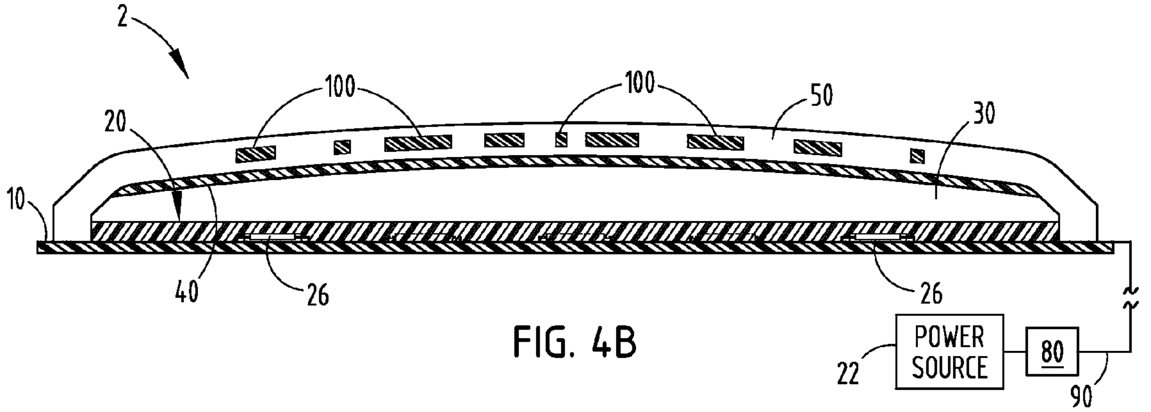
FIG. 4B is a cross-sectional view of the illuminated vehicle emblem assembly shown in FIG. 4.

As depicted in FIGS. 4, 4A and 4B, a second embodiment of illuminated vehicle emblem assembly 2 is depicted with a light-producing assembly 20 that contains light emitting diode (LED) sources 26 substituted for the light source 21. LED sources 26 may also be configured within light-pipe arrangements (not shown). One or more LED sources 26 may be configured within light-producing assembly 20. Further, LED sources 26 are coupled to, and obtain power for their illumination function from, power supply 22 (see FIG. 4A). It should be appreciated that various types of LED sources, including those that emanate light of different colors, may be employed in this second embodiment. The illuminated vehicle emblem assembly 2 shown in FIGS. 4, 4A and 4B is otherwise configured as described in connection with the schematic of emblem assembly 2 depicted in FIGS. 2 and 2A.

Figure 5:
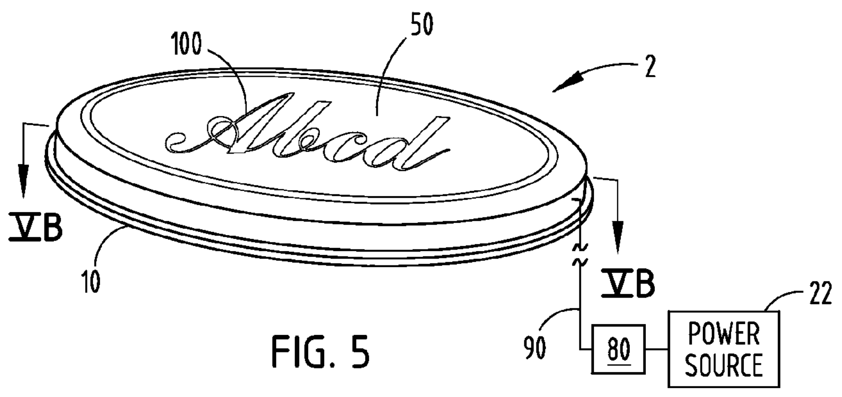
FIG. 5 is a top-down perspective view of an illuminated vehicle emblem assembly, according to a third embodiment.
Figure 5A:
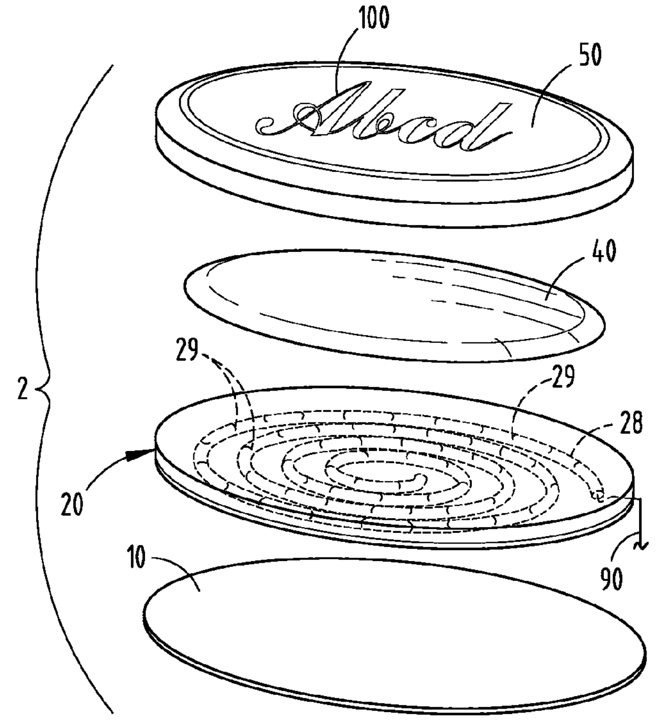
FIG. 5A is an exploded, perspective view of the illuminated vehicle emblem assembly shown in FIG. 5.
Figure 5B:
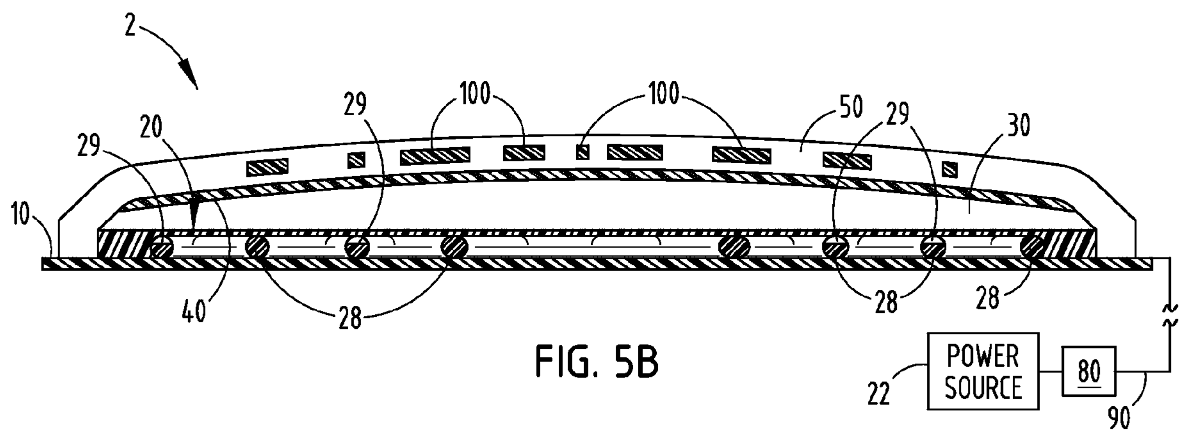
FIG. 5B is a cross-sectional view of the illuminated vehicle emblem assembly shown in FIG. 5.

A third embodiment of illuminated vehicle emblem assembly 2 is depicted in FIGS. 5, 5A and 5B with a light-producing assembly 20 containing fiber optic light cables 28 substituted for the light source 21. One or more fiber optic light cables 28 may be configured within light-producing assembly 20. In addition, the fiber optic light cable(s) 28 are coupled to, and obtain power for their illumination function from, power supply 22 (see FIG. 5A). Further, slits 29 are provided in fiber optic light cables 28 to ensure that light rays produced within the cables 28 are directed outward through base region 30, chromatic layer 40 and encapsulation structure 50. It should be understood that various types of fiber optic light cables 28, including those that emanate light of different colors, may be employed in this third embodiment. The illuminated vehicle emblem assembly 2 shown in FIGS. 5, 5A and 5B is otherwise configured as described in connection with the schematic of emblem assembly 2 depicted in FIGS. 2 and 2A.

Figure 6:
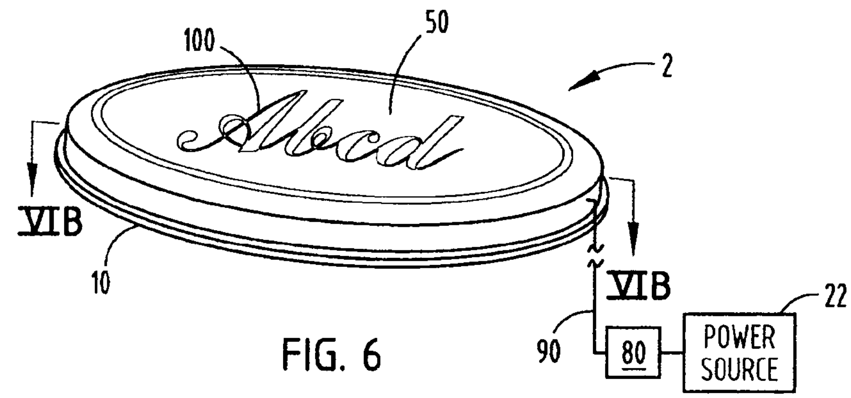
FIG. 6 is a top-down perspective view of an illuminated vehicle emblem assembly, according to a fourth embodiment.
Figure 6A:
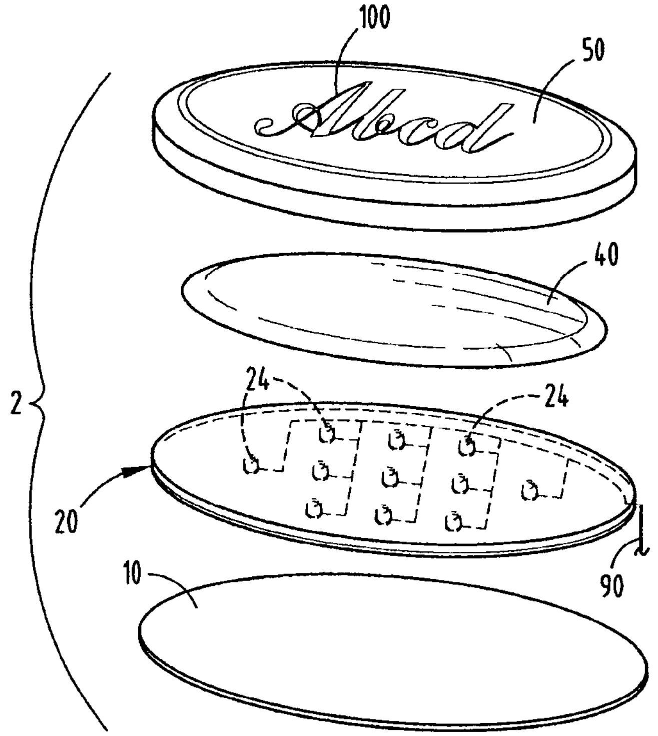
FIG. 6A is an exploded, perspective view of the illuminated vehicle emblem assembly shown in FIG. 6.
Figure 6B:
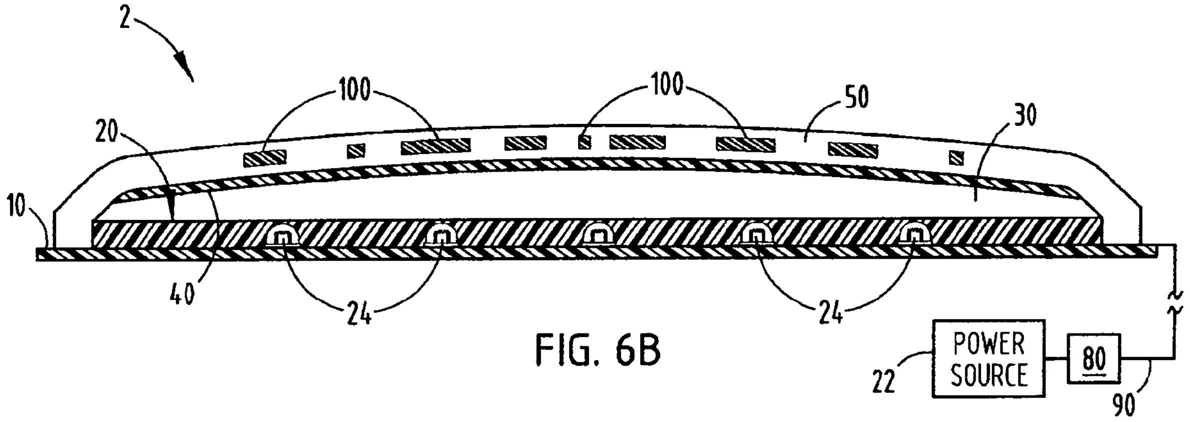
FIG. 6B is a cross-sectional view of the illuminated vehicle emblem assembly shown in FIG. 6.

Referring to FIGS. 6, 6A and 6B, a fourth embodiment of illuminated vehicle emblem assembly 2 is depicted with a light-producing assembly 20 that contains incandescent light bulbs 24 substituted for the light source 21. One or more incandescent light bulbs 24 are configured within light-producing assembly 20. Further, the light bulbs 24 are coupled to and obtain power for their illumination function from power supply 22 (see FIG. 6A). It should be appreciated that various types of incandescent light bulbs and filters, including those that emanate light of different colors, may be employed in this fourth embodiment of illuminated vehicle emblem assembly 2. The illuminated vehicle emblem assembly 2 shown in FIGS. 6, 6A and 6B is otherwise configured as described in connection with the schematic of emblem assembly 2 depicted in FIGS. 2 and 2A.

It should be appreciated that the first, second, third and fourth embodiments of illuminated vehicle emblem assembly 2, and variants of these embodiments, can be employed in various shapes, styles and configurations throughout engine compartment 3, and the interior and exterior of vehicle 1. In particular, the backing member 10 and/or encapsulation structure 50 can be employed in these shapes, styles and configurations. Further, design features 100 may be embedded within encapsulation structure 50. Under ambient conditions, these emblem assemblies 2 appear with a chrome or mirror-like finish, enhancing the attractiveness of the design features 100, e.g., the shape, logo or other graphics evident in the emblem. Further, these emblem assemblies 2 may be illuminated by the use of manual switches or other types of controller-driven configurations under low-light or night-time conditions. It is also possible to configure the power supply 22 and wiring arrangement 90 coupled to the light-producing assembly 20 for increased illumination flexibility. Variable intensity lighting options may be employed as light sources 21 in the light-producing assembly 24 including, but not limited to, LEDs, electroluminescent arrays, fiber optic cables and incandescent bulbs. A vehicle emblem assembly 2 configured with variable intensity light sources 21 can be adjusted to produce interesting lighting effects that complement its chrome or mirror-like finish.

Accordingly, the illuminated vehicle emblem assemblies 2 possess many features that are advantageous in automotive applications. For example, the features that provide the chrome or mirror-like appearance in the emblem assemblies 2 are protected from the outside environment by the encapsulation structure 50. The chromatic layer 40 and light-producing assembly 20 elements are less susceptible to peeling, flaking and other deterioration. In addition, the glowing appearance of the vehicle emblem assemblies 2 (when activated in an illuminated state) should not be distracting to vehicle operators compared to other, directional lighting sources employed by many other vehicle components. Still further, most of the lighting options for the light sources 21 use little power and can be supported by standard vehicle batteries. Hence, the illuminated vehicle emblem assemblies 2 can be arranged at various locations on the vehicle 1, requiring a wiring connection to the main power bus of the vehicle.

Variations and modifications can be made to the aforementioned structure without departing from the concepts of the present invention, and further such concepts are intended to be covered by the following claims unless these claims by their language expressly state otherwise.

We claim:

1. An illuminated vehicle emblem assembly, comprising:
- a power source;
- a backing member;
- a light-producing assembly coupled to the power source and supported by the backing member that includes an electroluminescent light source;
- a translucent base region over the light source;
- a chromatic layer over the translucent base region; and
- a translucent sealing structure over the chromatic layer that comprises a design feature and seals the backing member, the light-producing assembly, and the chromatic layer.

2. An illuminated vehicle emblem assembly according to claim 1, wherein the chromatic layer comprises indium-containing and aluminum-containing particles.

3. An illuminated vehicle emblem assembly according to claim 1, wherein the translucent sealing structure comprises glass particles, and an acrylic material, a polycarbonate material, a nylon material, or a blend of these materials.

4. An illuminated vehicle emblem assembly according to claim 1, wherein the electroluminescent light source comprises a pair of electrode structures and an active phosphor structure.

5. An illuminated vehicle emblem assembly according to claim 4, wherein the pair of electrode structures include an electrode comprising indium tin oxide material and an electrode comprising carbon material.

6. An illuminated vehicle emblem assembly according to claim 1, wherein the backing member is mounted to a vehicle.

7. An illuminated vehicle emblem assembly according to claim 6, wherein the backing member is mounted to a location within an engine compartment of the vehicle and the translucent sealing structure comprises blend of nylon and polycarbonate material at a ratio of 40 to 60% nylon to 40 to 60% polycarbonate material by weight.

8. An illuminated vehicle emblem assembly, comprising:
- a power source;
- a backing member;
- a light-producing assembly coupled to the power source and supported by the backing member that includes a light-emitting diode source;
- a translucent base region over the light source;
- a chromatic layer over the translucent base region; and a translucent sealing structure over the chromatic layer that comprises a design feature and seals the backing member, the light-producing assembly, and the chromatic layer.

9. An illuminated vehicle emblem assembly according to claim 8, wherein the chromatic layer comprises indium-containing and aluminum-containing particles.

10. An illuminated vehicle emblem assembly according to claim 8, wherein the translucent sealing structure comprises glass particles, and an acrylic material, a polycarbonate material, a nylon material, or a blend of these materials.

11. An illuminated vehicle emblem assembly according to claim 8, wherein the backing member is mounted to a vehicle.

12. An illuminated vehicle emblem assembly according to claim 11, wherein the backing member is mounted to a location within an engine compartment of the vehicle and the translucent sealing structure comprises a blend of nylon and polycarbonate material at a ratio of 40 to 60% nylon to 40 to 60% polycarbonate material by weight.

13. An illuminated vehicle emblem assembly, comprising:

a power source;

a backing member;

a light-producing assembly coupled to the power source and supported by the backing member that includes a fiber optic light source;

a translucent base region over the light source;

a chromatic layer over the translucent base region; and a translucent sealing structure over the chromatic layer that comprises a design feature and seals the backing member, the light-producing assembly, and the chromatic layer.

14. An illuminated vehicle emblem assembly according to claim 13, wherein the chromatic layer comprises indium-containing and aluminum-containing particles.

15. An illuminated vehicle emblem assembly according to claim 13, wherein the translucent sealing structure comprises glass particles, and an acrylic material, a polycarbonate material, a nylon material, or a blend of these materials.

16. An illuminated vehicle emblem assembly according to claim 13, wherein the backing member is mounted to a vehicle.

17. An illuminated vehicle emblem assembly according to claim 16, wherein the backing member is mounted to a location within an engine compartment of the vehicle and the translucent sealing structure comprises a blend of nylon and polycarbonate material at a ratio of 40 to 60% nylon to 40 to 60% polycarbonate material by weight.

* * * * *